Nov. 24, 1925.
L. J. COLE
1,562,687
HINGED LUG FOR BRAKE SHOES
Filed Jan. 10, 1925
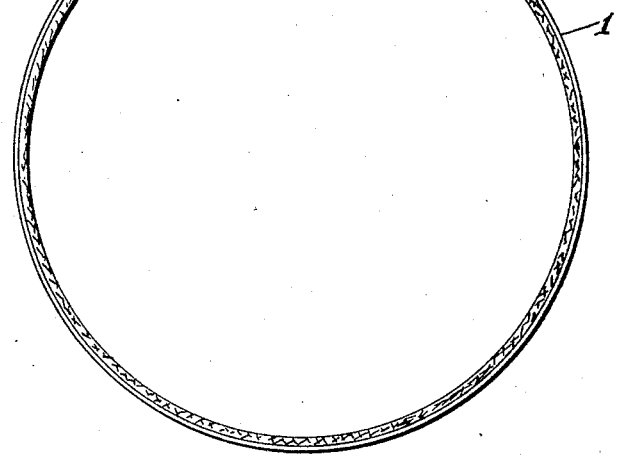
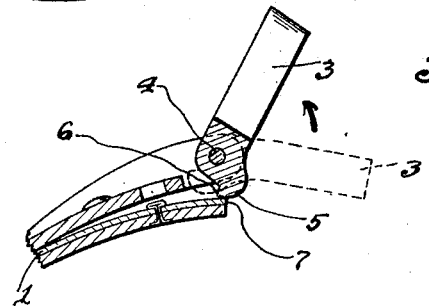
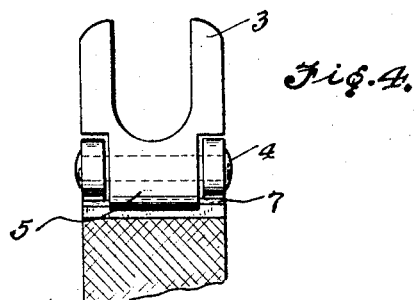
Inventor
L. J. Cole
By Lester L. Sargent
Attorney Patented Nov. 24, 1925.

1,562,687

UNITED STATES PATENT OFFICE.

LEONARD J. COLE, OF BUFFALO, NEW YORK.

HINGED LUG FOR BRAKE SHOES.

Application filed January 19, 1925. Serial No. 1,701.

*To all whom it may concern:*

Be it known that I, LEONARD J. COLE, a citizen of the United States, residing at Buffalo, in the county of Erie and State of New York, have invented a new and useful Hinged Lug for Brake Shoes, of which the following is a specification.

The object of this improvement is to overcome the difficulty in replacing worn out linings of planetary transmissions and particularly those on the Ford automobile. In the ordinary band the casing has to be removed and replaced, which generally takes several hours of time and work.

I attain the objects of my invention by the device illustrated in the accompanying drawings, in which—

Figure 1 is a side elevation of my invention applied to a brake band;

Fig. 2 is a detail sectional view of same in locked position;

Fig. 3 is a similar view of the device as it is being moved toward locked position, its initial position being indicated by dotted lines; and Fig. 4 is a front plan view of one of the hinged lugs 3.

Like numerals indicate like parts in each of the several views.

Referring to the accompanying drawings, I provide the conventional metal brake band 1 to which the brake shoes 2 are affixed. I provide hinged lug 3 pivotally mounted by means of stud or pin 4. Lugs 3 are provided with a protruding cam element 5 at their base which terminates in the shoulder 6, as shown in Figs. 2 and 3. In operating the device the lugs 3 are disposed approximately in line with the shoes 5, as indicated in dotted lines in Fig. 3 while the device is being put in place on the planetary drum. When the band 1 is in proper position the lugs 3 are swung, as indicated by the arrow in Fig. 3, to the position shown in Fig. 1, in which position the shoulder 6 abuts against the end 7 of metal band 1, thus holding the lugs in their normal upright position.

What I claim is:

1. A hinged lug for brake shoes consisting of a brake shoe, a pin mounted in the end of the brake shoe, a lug mounted on the pin and swingable outwardly from the brake shoe, said lug having a projecting cam base terminating in a shoulder member whereby the lug may be swung from a position approximately parallel to but forward of the brake shoe to a locked position approximately at right angles to the brake shoe.

2. In a device of the class described, the combination of a brake shoe, a lug mounted on the brake shoe and swingable outwardly toward the lug on the opposite end of the brake shoe, the lug having a cam-shaped base portion, said cam-shaped base portion including a shoulder portion which functions as a locking element when it abuts with the end of the conventional brake band, for the purposes described.

LEONARD J. COLE.